US011106654B2

(12) United States Patent
Yoon et al.

(10) Patent No.: US 11,106,654 B2
(45) Date of Patent: Aug. 31, 2021

(54) TECHNIQUE FOR DUPLEXING DATABASE

(71) Applicant: SILCROAD SOFT, INC., Gyeonggi-do (KR)

(72) Inventors: Jeong Il Yoon, Gyeonggi-do (KR); Owook Jo, Gyeonggi-do (KR)

(73) Assignee: SILCROAD SOFT, INC., Suwon-si (KR)

( * ) Notice: Subject to any disclaimer, the term of this patent is extended or adjusted under 35 U.S.C. 154(b) by 125 days.

(21) Appl. No.: 16/344,129

(22) PCT Filed: Nov. 9, 2017

(86) PCT No.: PCT/KR2017/012685
§ 371 (c)(1),
(2) Date: Apr. 23, 2019

(87) PCT Pub. No.: WO2018/097522
PCT Pub. Date: May 31, 2018

(65) Prior Publication Data
US 2019/0332594 A1    Oct. 31, 2019

(30) Foreign Application Priority Data
Nov. 28, 2016    (KR) .................. 10-2016-0159562

(51) Int. Cl.
*G06F 7/00* (2006.01)
*G06F 17/00* (2019.01)
(Continued)

(52) U.S. Cl.
CPC ...... *G06F 16/2358* (2019.01); *G06F 11/3433* (2013.01); *G06F 16/27* (2019.01)

(58) Field of Classification Search
None
See application file for complete search history.

(56) References Cited

U.S. PATENT DOCUMENTS 7,177,866 B2 *    2/2007 Holenstein .......... G06F 11/2064
                                                            707/615
2005/0154697 A1 *   7/2005 Altaf ..................... G06F 16/27
(Continued)

FOREIGN PATENT DOCUMENTS

KR    20150137884 A    12/2015
KR    101589213 B1    1/2016
(Continued)

OTHER PUBLICATIONS

International Search Report for application No. PCT/KR2017/012685 dated Feb. 8, 2018.

*Primary Examiner* — Tuan A Pham
(74) *Attorney, Agent, or Firm* — Moser Taboada (57) ABSTRACT

Disclosed is a computer program stored in a computer readable storage medium, which includes encoded commands, wherein executing the computer program by one or more processors of a computer system allows the one or more processors to perform steps for change data capture (CDC) between a source database and a target database. The steps may include: a resource data acquisition step of acquiring resource data which is data obtained by monitoring a current resource of a source database server; a comparison information generation step of generating comparison information by comparing the resource data and a predetermined source database server load threshold value; a mode determination step of determining an operation mode of a changed data capture process which operates in the source database server based on the comparison information, the operation mode including a union mode and a division mode; and a mode changing step of changing the operation mode of the process to a mode determined in the mode determination step.

6 Claims, 5 Drawing Sheets

(51) Int. Cl.
  *G06F 16/23*    (2019.01)
  *G06F 16/27*    (2019.01)
  *G06F 11/34*    (2006.01)

(56) References Cited

U.S. PATENT DOCUMENTS

| | | | |
|---|---|---|---|
| 2010/0114841 A1* | 5/2010 | Holenstein | G06F 16/217 |
| | | | 707/690 |
| 2011/0145193 A1 | 6/2011 | Pareek et al. | |
| 2017/0060695 A1* | 3/2017 | Clare | G06F 3/065 |
| 2018/0253483 A1* | 9/2018 | Lee | G06F 16/27 |

FOREIGN PATENT DOCUMENTS

| | | |
|---|---|---|
| KR | 20160004721 A | 1/2016 |
| WO | WO-2016168855 A1 | 10/2016 |

\* cited by examiner

TECHNIQUE FOR DUPLEXING DATABASE

BACKGROUND

Field of the Invention

The present disclosure relates to a database, and more particularly, to an efficient change data capture (CDC) technique.

Discussion of Related Art

Businesses of enterprises are rapidly expanding with explosive data growth and the emergence of diverse environments and platforms. As new business environments emerge, more efficient and flexible data services and information processing, and data management functions are needed. In response to these changes, a research is continued on databases to solve problems of high performance, high availability, and scalability which are foundations of corporate business implementation.

Data managed within an enterprise often needs to be migrated or replicated from a source location to a target location to be managed. For example, a database system for implementing banking business can be categorized into a database that can be accessed by a plurality of external customers at the same time and a database that can be accessed by internal employees, depending on the characteristics of clients accessing the database system. In using the two databases in one database system, synchronization between both databases needs to be made in order to maintain data integrity. However, implementing such synchronization may result in overhead for database resources.

In recent years, with a growing demand for real-time data analysis by enterprises, when data has been changed in a specific DB, a necessity for a technique that captures the changed data and transfers the captured data to another DB has been emerged. A data warehouse (DW), which is a corporate analysis DB, is general to update data generated during business hours until the day before by batching at night time after work. For this reason, the existing DW structure cannot but analyze data up to yesterday. For example, when a bank reviews customers' loans, the bank has considered and evaluated data up to yesterday. For this reason, customer information changed today is forced to be overlooked by the loan review. Thus, there is a demand for improving the speed of synchronization in database synchronization.

Korean Patent Unexamined Publication No. 10-2015-0137884 discloses an example of the database synchronization.

SUMMARY OF THE INVENTION

The present disclosure has been made in an effort to improve a synchronization speed of a database.

According to an embodiment of the present disclosure, disclosed is a computer program stored in a computer readable storage medium, which includes encoded commands, wherein executing the computer program by one or more processors of a computer system allows the one or more processor to perform the following steps for change data capture (CDC) from a source database to a target database. The steps may include:

a resource data acquisition step of acquiring resource data which is data obtained by monitoring a current resource of a source database server;

a comparison information generation step of generating comparison information by comparing the resource data and a predetermined source database server load threshold value;

a mode determination step of determining an operation mode of a changed data capture process which operates in the source database server based on the comparison information, the operation mode including a union mode and a division mode; and a mode changing step of changing the operation mode of the process to a mode determined in the mode determination step.

Alternatively, the mode determination step may include determining the operation mode of the changed data capture process as the union mode when the resource data is less than the predetermined source database server load threshold value in the comparison information, and determining the operation mode of the changed data capture process as the division mode when the resource data is equal to or more than the predetermined source database server load threshold value in the comparison information.

Alternatively, the steps may further include: when the operation mode is changed to the union mode by the mode changing step of changing the operation mode of the process to the mode determined in the mode determination step, an extraction step of extracting, by the source database, changed information included in a record of a redo log of the source database;

an assembly step of analyzing a transaction for the extracted changed information and reassembling associated transactions to generate changed data; and a reflection step of completing commit of the changed data and reflecting the committed changed data to a target database.

Alternatively, a thread executing each step in each of the assembly step to the reflection step may be processed by referring to a task queue, the task queue being at least a part of a memory storing the changed information and the changed data.

Alternatively, the steps may further include: when the operation mode is changed to the division mode by the mode changing step of changing the operation mode of the process to the mode determined in the mode determination step, an extraction step of extracting, by the source database, changed information included in the record of the redo log of the source database; and a transmission step of generating, by a target database server, the changed data by reassembling the transactions for the changed information and transmitting the changed information to the target database so as to reflect committed changed data to the target database.

Alternatively, in the mode changing step, a mode change may be executed when the task queue is empty.

Alternatively, the resource data acquisition step may be a step of acquiring resource data which is data obtained by monitoring at least one resource of a CPU usage, a memory available capacity, and an input/output load of the source database server.

According to an embodiment of the present disclosure, disclosed is a server performing change data capture (CDC) between a source database and a target database. The server may include:

a resource data acquisition module acquiring resource data which is data obtained by monitoring a current resource of a source database server;

a comparison information generation module generating comparison information by comparing the resource data and a predetermined source database server load threshold value; and a control module determining an operation mode of a changed data capture process which operates in the source database server based on the comparison information, the operation mode including a union mode and a division mode, and changing an operation mode of the process to the determined mode.

According to an embodiment of the present disclosure, disclosed is a method for performing change data capture (CDC) between a source database and a target database. The method may include:

a resource data acquisition step of acquiring resource data which is data obtained by monitoring a current resource of a source database server;

a comparison information generation step of generating comparison information by comparing the resource data and a predetermined source database server load threshold value;

a mode determination step of determining an operation mode of a changed data capture process which operates in the source database server based on the comparison information, the operation mode including a union mode and a division mode; and a mode changing step of changing the operation mode of the process to a mode determined in the mode determination step.

According to an embodiment of the present disclosure, a synchronization speed of a database can be improved.

BRIEF DESCRIPTION OF DRAWINGS

Some of embodiments are illustrated in the accompanying drawings so as to appreciate features of the mentioned disclosed contents with reference to the following embodiments through detailed and more concrete description. Further, it is intended that like reference numerals in the drawing denote the same or similar function throughout several aspects. However, the accompanying drawings just illustrate only specific typical exemplary embodiments of the disclosed contents and are not considered to limit the scope of the present disclosure and it should be noted that other exemplary embodiments having the same effect can be sufficiently recognized.

DETAILED DESCRIPTION OF EXEMPLARY EMBODIMENTS

Various embodiments will now be described with reference to drawings. In the present specification, various descriptions are presented to provide appreciation of the present disclosure. However, it is apparent that the embodiments can be executed without the specific description. In other examples, known structures and apparatuses are presented in a block diagram form in order to facilitate description of the embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication with another system through local and/or remote processing according to a signal (for example, data from one component that interacts with other components and/or data from other systems through a network such as the Internet through a signal in a local system and a distribution system) having one or more data packets, for example.

The computer-readable medium in the present specification may include all kinds of storage media storing programs and data so as to be readable by the computer system. According to an aspect of the present disclosure, the media may include a read only memory (ROM), a random access memory (RAM), a compact disk (CD)-ROM, a digital video disk (DVD)-ROM, a magnetic tape, a floppy disk, an optical data storage device, and the like. Additionally, the media are distributed to systems connected through a network to store computer readable codes and/or commands in a distribution scheme.

Moreover, it should be appreciated that the word "comprises" and/or "comprising" means that the corresponding feature and/or component is present, but presence or addition of one or more other features, components, and/or a group thereof is not excluded. Further, when not separately specified or not clear in terms of the context that a singular form is indicated, it should be construed that the singular form generally means "one or more" in the present specification and the claims.

Further, the terms "information" and "data" used in the specification may also be often used to be exchanged with each other.

The objects and effects of the present disclosure, and technical constitutions of accomplishing these will become obvious with reference to embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention of a user or an operator or usual practice.

However, the present disclosure is not limited to embodiments disclosed below but may be implemented in various different forms. However, the embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

Figure 1:
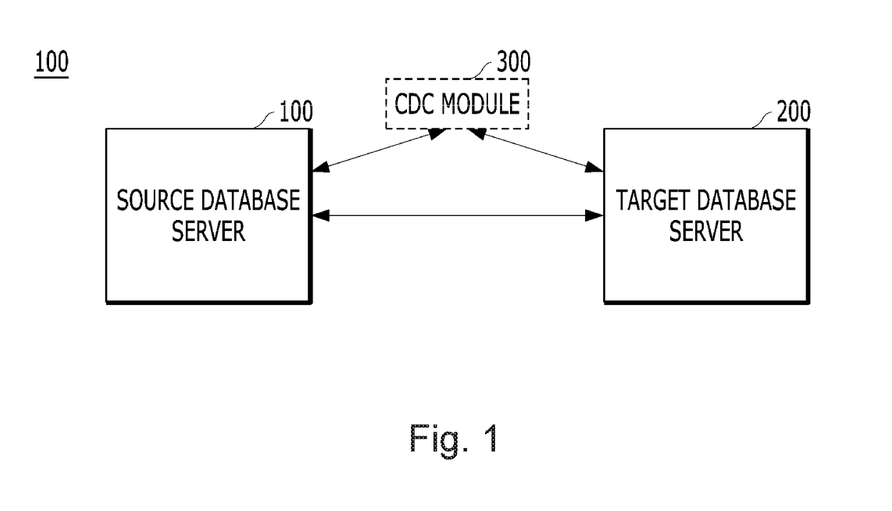
FIG. 1 is a conceptual view illustrating a database system according to an embodiment of the present disclosure.

A database and a database server in this specification may be used interchangeably with each other. Further, a record of a redo log in this specification may be used interchangeably with a redo log FIG. 1 is a conceptual view illustrating a database system according to an embodiment of the present disclosure.

A source database server 100 may be positioned remotely from a target database server 200 or may be constituted by one server. In addition, the source database server 100 and the target database server 200 may refer to servers of the same type or servers with different configurations.

Additionally, the source database server and the target database server may include, but is not limited thereto, a device including a processor and a memory as a predetermined type of database server. That is, the source database server may include software, firmware, and hardware or a combination thereof. The software may include a database table, a schema, and an application(s) for generating, deleting, and modifying indexes and/or data. The source database server 100 may receive the transactions from the client or another computing device and exemplary transactions may include at least one of retrieving, adding, modifying, and deleting the data, the table, and/or the index in the source database server 100.

The target database server 200 may mean a database server in which data change contents generated in the source database server 100 are replicated or synchronized and include at least some of features of the source database server 100. For example, the target database server 200 may store copies for at least one of data, data types, tables, indexes, changed information, changed data, and records of a redo log of the source database server 100.

The record of the redo log in this specification may includes a data record that may identify changed contents for a structure and an organization of the data in the database and/or changed contents related to a table, a column, a data type, an index, data, etc.

In an embodiment of the present disclosure, a CDC module 300 may mean a separate entity for implementing a CDC between the source database server 100 and the target database server 200. Accordingly, the CDC module 300 may perform predetermined operations for implementing CDC features.

The CDC module 300 may include, but is not limited thereto, a device including a processor and a memory for executing and storing commands as a predetermined type of server. The CDC module 300 may include software, firmware, and hardware or a combination thereof. For example, software that implements operations of the CDC module 300 may be installed in at least one of the source database server 100 and the target database server 200.

Functions of the CDC module 300 illustrated in FIG. 1 may be integrated into a part of at least one of the source database server 100 and the target database server 200. For example, a CDC function of the CDC module 300 may be replaced by the source database server 100.

Figure 2:
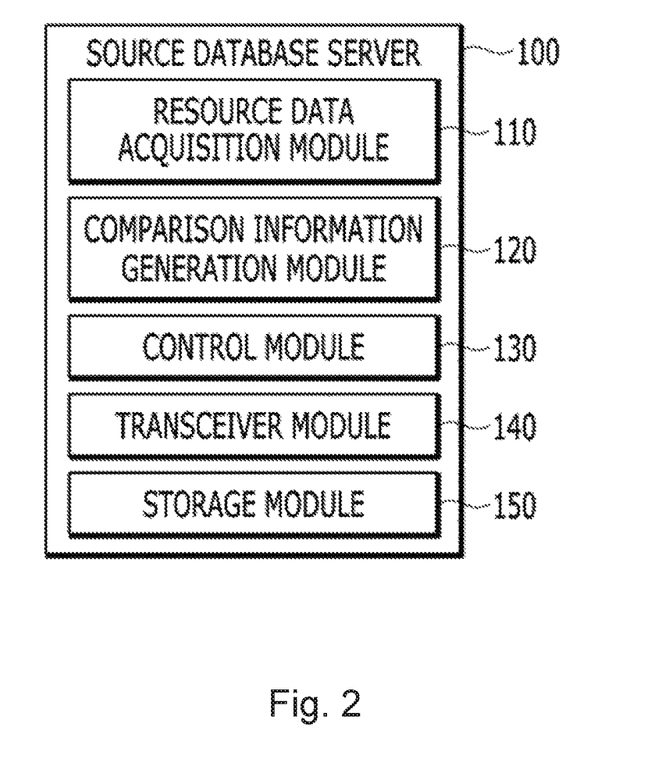
FIG. 2 is a block diagram illustrating a configuration of a source database server according to an embodiment of the present disclosure.

FIG. 2 is a block diagram illustrating a configuration of a source database server 100 according to an embodiment of the present disclosure. In FIG. 2, the source database server 100 is illustrated as an example, but as described above, the source database server 100 may be replaced by at least one of the CDC module 300 and the target database server 200 or a combination thereof.

As illustrated in FIG. 2, the source database server 100 may include a resource data acquisition module 110, a comparison information generation module 120, a control module 130, a transceiver module 140, and a storage module 150. The components of the source database server 100 described above are exemplary and additional components may be present or some of the additional components may be omitted.

The resource data acquisition module 110 may acquire resource data, which is data acquired by monitoring a current resource of the source database server 100. The source database server 100 may quantitatively acquire the resource data based on a current resource usage or may calculate a percentage of the current resource to all resources. Alternatively, the resource data acquisition module 110 may acquire resource data for available resources. The resource data acquisition module 110 may monitor the resources of the source database server 100 in real time and retrieve past resource data. The resource data acquisition module 110 may predict a future resource situation of the source database server 100 based on at least one of the past resource data and the current resource data.

According to an embodiment of the present disclosure, the resource data acquisition module 110 may acquire resource data, which is data acquired by monitoring at least one of a CPU usage, a memory available capacity, and an I/O load of the source database server 100. For example, when there is a large number of users accessing the source database server 100 and the CPU usage is rapidly increased, the resource data may be generated based on the increased CPU usage. In addition, when the amount of data which a task queue may contain in the memory exceeds an acceptable amount, the resource data may contain information with a memory available capacity of 0%. The resource data is just an example and the present disclosure is not limited thereto.

The comparison information generation module 120 compares the resource data with a predetermined source database server load threshold value to generate comparison information. The comparison information may be information obtained by comparing magnitudes of the resource data and the predetermined source database server load threshold value. The threads of the comparison information generation module 120 access at least one of the memory and a persistent storage and refer to the resource data to generate the comparison information. The predetermined source database server load threshold value may be a reference value that may visually show performance degradation of a system. For example, a CPU usage may be set as the reference value, in which a time to access the source database and load specific data is longer than 0.5 ms. Further, the predetermined source database server load threshold value may be determined as a quantitative ratio for all resources. For example, 70% of the total memory may be set as the source database server load threshold value and compared with the current memory usage. The predetermined source database server load threshold value is only an example, and the present disclosure is not limited thereto.

A control module 130 may control all operations of the source database server 100. That is, the control module 130 may perform an extraction operation of confirming the redo log of the source database and extracting the changed information included in the record of the redo log, an assembly operation of analyzing a transaction for the extracted changed information and reassembling respective associated transactions to generate the changed data, and a reflection operation of completing commit of the changed data and reflecting the committed changed data to the target database. The assembly operation may include a conversion operation to a format suitable for the target database. Further, the assembly operation may include operations including generation, conversion, and the like of a query (DNL, DDL, etc.) which may be recognized by the target database server 200. The assembly operation may include generation and conversion operations to data transmittable over the network and in accordance with an aspect, the control module 130 may perform a reflection operation of adding, modifying, and deleting at least a part of the target database based on the committed change data. At least one of the assembly operation and the reflection operation may be performed by the target database server 200.

According to an embodiment of the present disclosure, the control module 130 may determine an operation mode of a changed data capture process operating on the source database server based on the comparison information. Here, the operation mode may include the union mode and the division mode.

According to an embodiment of the present disclosure, the control module 130 may determine the operation mode mode of the changed data capture process as the union mode when the resource data is less than the predetermined source database server load threshold value in the comparison information. Further, the control module 130 may determine the operation mode mode of the changed data capture process as the division mode when the resource data is equal to or more than the predetermined source database server load threshold value in the comparison information. A condition for determining the operation mode may further includes various conditions. For example, when a time for which the resource data is less than the predetermined source database server load threshold value is continuously 3 seconds or more, the control module may determine the operation mode as the union mode. In addition, the condition includes a condition in which it is impossible to change the operation mode to another operation mode within a predetermined time to prevent a situation in which only a mode change is continued. The condition for determining the operation mode may be determined by considering a delay time required for processing the data due to the mode change. The condition for determining the operation mode is just an example and the present disclosure is not limited thereto.

The union mode may cause the changed data capture process to perform the extraction operation, the assembly operation, and the reflection operation or the combination of the operations in the source database server 100. Further, the union mode may further include operations other than the above operations.

In the union mode, the control module 130 may execute the extraction operation of extracting the changed information included in the record of the redo log of the source database in the source database. The record of the redo log may include changed information of one or more redo logs. The record of the redo log may include one or more task commands constituting the transaction. The changed information may be information acquired by analyzing the change of the records of one or more redo logs. The changed information may be stored in a first task queue.

In the union mode, the control module 130 may perform an assembly operation of analyzing the transaction for the extracted changed information and reassembling the respective associated transactions to generate the changed data. The control module 130 may reassemble the transactions included in the changed information of the redo log for each associated transaction until the committed transaction is analyzed. The reassembly operation for each transaction may mean recreation of the transaction. The committed changed data may be stored in a second task queue.

In the union mode, the control module 130 may execute a reflection operation of completing the commit of the changed data and reflecting the committed changed data to the target database. In the assembly operation, when the committed transaction is analyzed, the commit of the changed data may be completed and the committed changed data may be generated. The committed changed data may be reflected to the target database through a predetermined session. The reflection operation may be executed remotely with respect to the target database by the changed data capture process of the source database server.

The transceiver module 140 may transmit the committed changed data through a predetermined session between the changed data capture process of the source data server and the target database. The predetermined session may include arbitrary networks including a public network, a private network, a private network, a virtual private network (VPN), and the like. The predetermined session may include arbitrary wireless network communication. The predetermined session is just an example and the present disclosure is not limited thereto.

According to an embodiment of the present disclosure, the extraction operation, the assembly operation and the reflection operation may be executed by an extraction thread, an assembly thread, and a reflection thread, respectively. The control module 130 may include the extraction thread, the assembly thread, and the reflection thread. The extraction thread, the assembly thread, and the reflection thread may execute only fixed operations of the respective threads without performing other operations because respective execution operations are settled.

In the union mode, since the source database server 100 recreates the transaction by communication with the memory of the source database server instead of reassembly of the transaction through network communication with the target database server 200, the speed of the assembly operation of recreating the transaction may be faster. Further, the transactions are not delivered from the source database server 100 to the target database server 200 through the network communication, but the committed changed data is directly reflected to the target database. Accordingly, since transmission data through the network communication is reduced, a total speed of the database synchronization may be improved.

The division mode may cause the changed data capture process to perform the extraction operation, and the transmission operation or the combination of the operations in the source database server 100. In the division mode, the source database server 100 may transmit the changed information to the target database so that the target database server 200 reassembles the transactions for the change information to generate the changed data and reflects the committed changed data to the target database. Further, the division mode may further include operations other than the above operations.

In the division mode, the control module 130 may execute the extraction operation of extracting the changed information included in the record of the redo log of the source database in the source database. The record of the redo log may include changed information of one or more redo logs. The record of the redo log may include one or more job commands constituting the transaction. The changed information may be information acquired by analyzing the change of the records of one or more redo logs. The changed information may be stored in the task queue.

In the division mode, the transceiver module 140 may perform the transmission operation of transmitting the changed information to the target database so that a CDC process of the target database server 200 reassembles the transactions for the change information to generate the changed data and reflects the committed changed data to the target database. The transceiver module 140 of the source database server 100 may transmit the changed information to the target database server 200 so that the control module of the target database server 200 performs the assembly operation of generating the changed data based on the changed information. The transceiver module of the target database server 200 may receive the changed information. The target database server 200 may perform the assembly operation of analyzing the transaction for the changed information based on the changed information and reassembling the associated transactions to generate the changed data and write the committed changed data to the target database through the reflection operation of reflecting the committed changed data to the target database when the commit of the changed data is completed.

According to an embodiment of the present disclosure, the extraction operation and the transmission operation may be executed by the extraction thread and the transmission thread, respectively. The control module 130 may include the extraction thread and the transmission thread. The extraction thread and the transmission thread may execute only the fixed operations of the respective threads without performing another operation since each execution operation is settled.

The division mode causes the assembly operation of the transaction to be executed in the target database server to reduce the load of the source database server. The division mode may increase the quantity of available resources of the source database server and allow more users to access or allow multiple accesses to the database server or data changes.

According to an embodiment of the present disclosure, the control module 130 may change the operation mode of the changed data capture process to a mode determined based on the comparison information. The operation mode of the changed data capture process includes the union mode and the division mode. Depending on the operation mode, the threads operating in the source database and the target database may be changed. Depending on the operation mode, the source database server and the target database server may be selected in the same operation mode or the operation mode of the target database server may be changed based on the operation mode of the source database server. Depending on the operation mode, an operation thread performing each operation may be changed in the source database server 100.

The transceiver module 140 may provide a communication function with the database servers and/or the client. For example, the transceiver module 140 may transmit at least one of the record of the redo log, the changed information, and the changed data which are extracted to the target database and receive the at least one. Further, the transceiver module 140 may communicate with the databases and/or the client by using the predetermined network and/or database link described above.

The transceiver module 140 may receive data storage, change, inquiry and index build, change, inquiry request, etc., from the client. As an alternative embodiment, the transceiver module 140 may deliver information from the source database server 100 to the target database server 200 by a scheme of invoking a procedure to the target database server 200. Moreover, the transceiver module 140 may provide a function to transceive predetermined data/information delivered between the servers in association with database replication.

The storage module 150 may store predetermined data stored in association with performing the CDC such as storing at least one of the extracted changed information and changed data. The storage module 150 may store predetermined data stored in association with execution of the tasks by the database servers 100 and 200. Further, the storage module 150 may process and manage a request related to storing (including update) of the data in the server. For example, the storage module 150 may determine to store the data and the changed information and store the data and changed information. Further, the storage module 150 may determine storage locations for the data and/or the changed information. For example, the storage module 150 may determine the storage location of in the task queue of the memory to store the data. As another example, the storage module 150 may determine the storage location of the data in the persistent storage.

Figure 3:
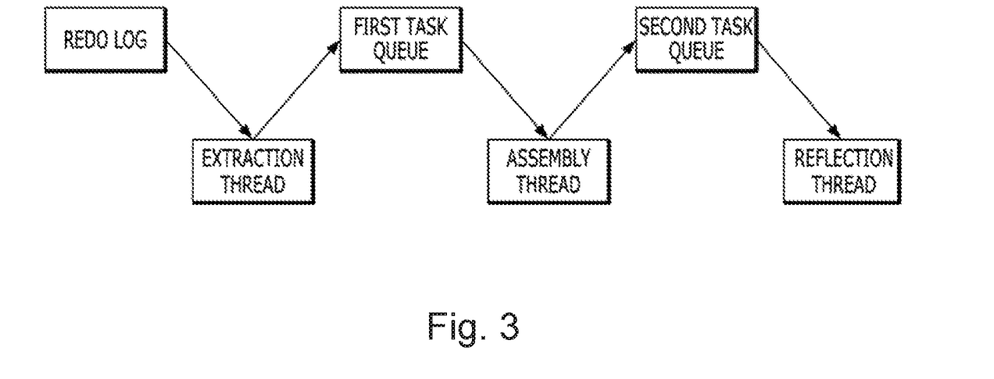
FIG. 3 is a conceptual view illustrating a configuration of a work queue referred to by threads of each operation in a union mode according to an embodiment of the present disclosure.

FIG. 3 is a conceptual view illustrating a configuration of a task queue referred to by threads of each operation in a union mode according to an embodiment of the present disclosure.

According to an embodiment of the present disclosure, the threads that execute the assembly operation and the reflection operation performed in the source database server 100 may be processed by referring to the first task queue and the second task queue, respectively. The task queue may store at least one of the changed information and the changed data. The task queue may be at least a part of a memory cache. The task queue may be at least a part of the persistent storage. The assembly thread of performing the assembly operation may repeatedly execute the assembly operation of analyzing the transaction for the extracted changed information and reassembling the associated transactions. The reflection thread that performs the reflection operation may repeatedly execute the reflection operation of completing the commit of the changed data and reflecting the committed changed data to the target database. The extraction thread that executes the extraction operation may repeatedly execute the extraction operation of extracting the changed information included in the record of the redo log of the source database in the source database.

According to an embodiment of the present disclosure, queues storing changed information and changed data of the task queues may be configured separately. Specifically, in FIG. 3, the changed information may be stored in the first task queue and the changed data may be stored in the second task queue. The extraction thread executing the extraction operation may extract the changed information by referring to the record of the redo log. The extraction thread may store the changed information in the first task queue. The assembly thread executing the assembly operation analyzes the transaction by referring to the changed information stored in the first task queue and reassemblies the associated transactions to generate the changed data. The assembly operation may be repeatedly executed until the committed transaction is analyzed. The changed data which may be acquired as a result of reassembling the transaction may be stored in the second task queue by the assembly thread. The reflection thread executing the reflection operation may complete the commit of the changed data by referring to the changed data stored in the second task queue and reflect the committed changed data to the target database.

The changed information and the changed data may be stored in the task queue and the assembly thread performing the assembly operation may update or add, delete, and change the information stored in the second task queue. The extraction thread executing the extraction operation may refer to at least one of the redo log and the record of the redo log and update or add, delete, and change the information stored in the first task queue.

According to an embodiment of the present disclosure, when the operation mode change occurs between the union mode and the division mode, the change may be executed in a state in which all task queues are empty. For example, when the operation mode is changed from the union mode to the division mode, in the case where the assembly thread completes referring to the changed information in the first task queue, the assembly thread may change the first task queue to an empty state. Further, when the reflection thread completes referring to the changed data stored in the second task queue, the reflection thread may change the second task queue to the empty state. When a series of tasks are completed and the respective tasks queues becomes the empty state, the operation mode of the process may be changed to the mode determined by the control module. The reflection thread operates in such a scheme to prevent data from being lost during changing the modes.

According to an embodiment of the present disclosure, when the operation mode is changed from the division mode to the union mode, the extraction thread and the transmission thread of the division mode may be inactivated and the extraction thread, the assembly thread, and the reflection thread of the union mode may be activated. When the operation mode is changed from the union mode to the division mode, the extraction thread, the assembly thread, and the reflection thread of the union mode may be inactivated and the extraction thread and the transmission thread of the division mode may be activated.

Figure 4:
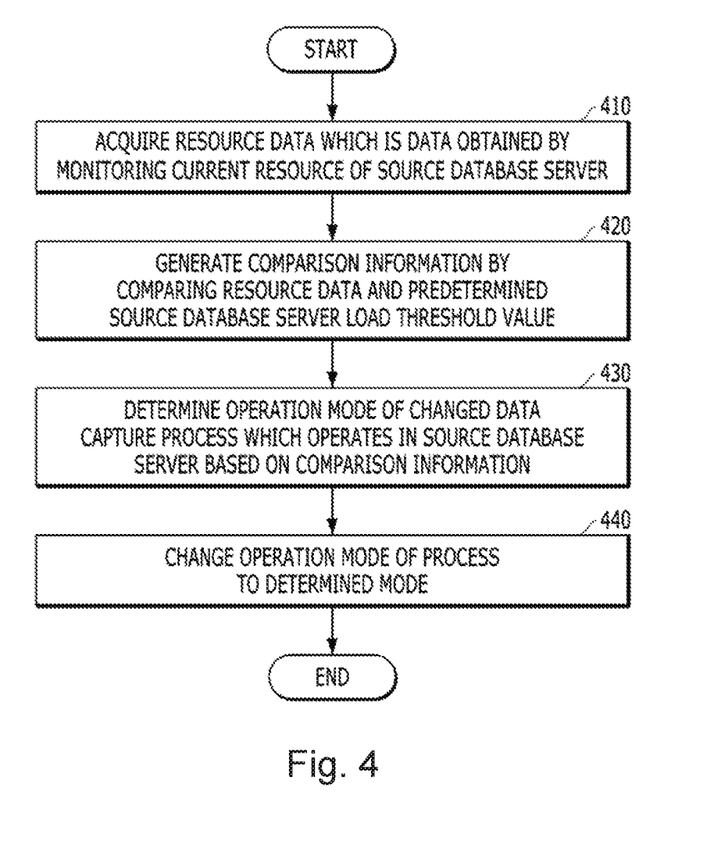
FIG. 4 is a flowchart illustrating a synchronization method of a database in which an operation mode is changeable according to an embodiment of the present disclosure.

FIG. 4 is a flowchart illustrating a synchronization method of a database in which an operation mode is changeable according to an embodiment of the present disclosure.

t will be now described that the method presented in FIG. 4 is performed by the source database server 100 for convenience of description, but as described above, depending on an implementation aspect, the method may be implemented by the target database server 200 or the CDC module 300 or the combination thereof.

The source database server 100 may acquire resource data which is data acquired by monitoring a current resource of the source database server (410). The resource data may be stored in a part of at least one of the memory and the persistent storage.

The source database server 100 compares the resource data with a predetermined source database server load threshold value to generate comparison information (420).

The magnitudes of the resource data and the source database server load threshold value may be compared with each other.

The source database server 100 may determine the operation mode of the changed data capture process which operates in the source database server based on the comparison information (430). The operation mode may include the union mode and the division mode. In the source database server 100, the union mode may include the extraction operation, the assembly operation, and the reflection operation. In the source database server 100, the division mode may include the extraction operation and the transmission operation. In the target database server 200, the division mode may include the assembly operation and the reflection operation.

The source database server 100 may change the operation mode of the process to the mode determined based on the comparison information (440).

Figure 5:
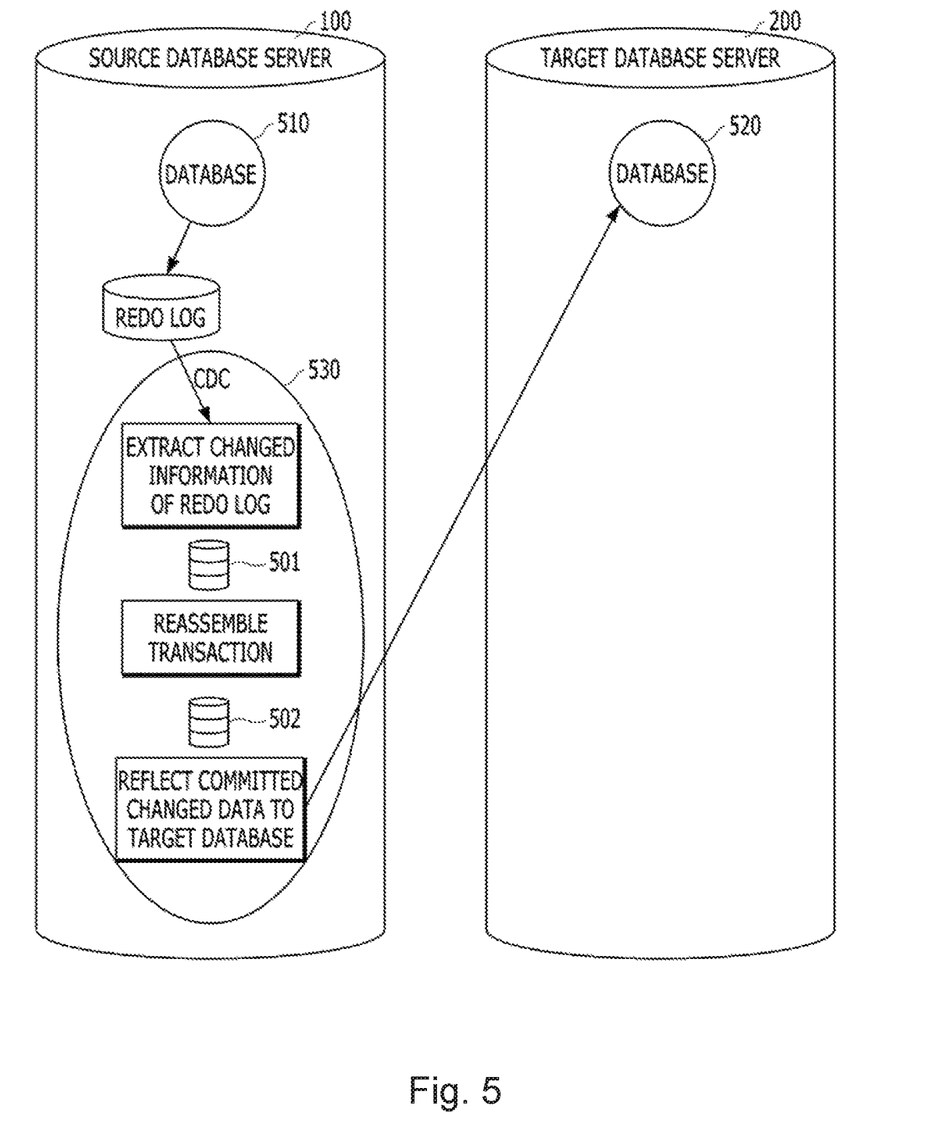
FIG. 5 is a conceptual view illustrating a synchronization method of a database in a union mode according to an embodiment of the present disclosure.

FIG. 5 is a conceptual view illustrating a synchronization method between databases in a union mode according to an embodiment of the present disclosure.

According to an embodiment of the present disclosure, the control module 130 may change a changed data process 530 of the source database server to the union mode based on the changed information. In a source database 510, the control module 130 may extract the changed information of the redo log. The changed information may be stored in a first task queue 501. The control module 130 of the source database server 100 analyzes the transaction for the changed information and reassemblies the associated transactions to generate changed data. The changed data may be stored in a second task queue 502. The control module 130 may complete the commit of the changed data and reflect the committed changed data to the target database. The changed data committed by the control module as a settled value may be a value reflected to the target database. The transceiver module 140 of the source database server 100 may transmit changed data committed through a predetermined session between the changed data capture process 530 of the source database server and the target database so as to reflect the committed changed data to the target database.

In the union mode, since the source database server 100 recreates the transaction by communication with the memory of the source database server instead of reassembly of the transaction through network communication with the target database server 200, the speed of the assembly operation of recreating the transaction may be faster. Further, the transactions are not delivered from the source database server 100 to the target database server 200 through the network communication, but the committed changed data is directly reflected to the target database. Accordingly, since transmission data through the network communication is reduced, a total speed of the database synchronization may be improved.

Figure 6:
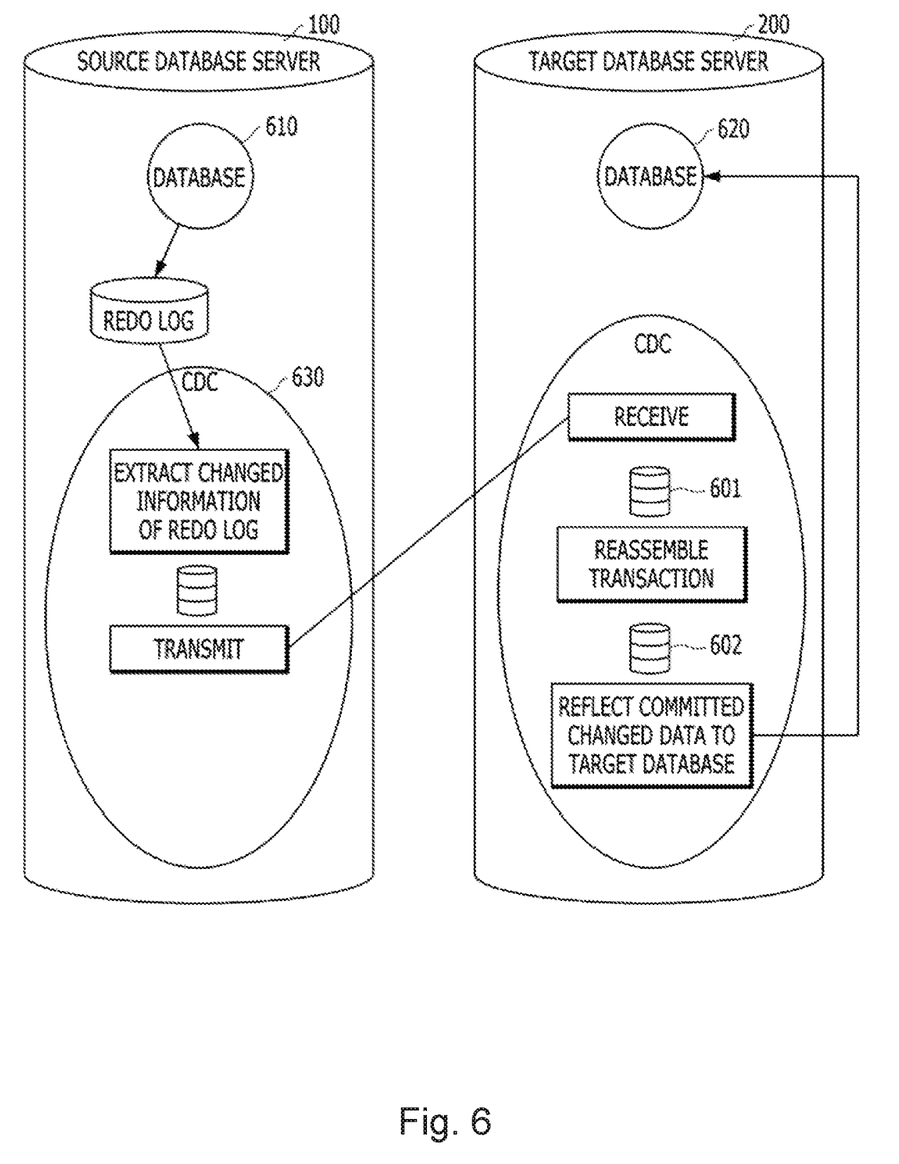
FIG. 6 is a conceptual view illustrating a synchronization method of a database in a division mode according to an embodiment of the present disclosure.

FIG. 6 is a conceptual view illustrating a synchronization method of a database in a division mode according to an embodiment of the present disclosure.

According to an embodiment of the present disclosure, the control module 130 may change a changed data process 630 of the source database server 100 and a changed data process of the target database server 200 to the division mode based on the changed information. In the source database, the control module 130 may extract the changed information of the redo log. The changed information may be stored in the task queue. The transceiver module 140 of the source database server may transmit the changed information to the target database. In this case, the changed information may be transmitted through a predetermined session between the source database server 100 and the target database server 200. The transceiver module of the target database server 200 may receive the changed information. The received changed information may be stored in a third task queue 601. The control module of the target database server 200 analyzes the transaction for the changed information and reassemblies the associated transactions to generate changed data. The changed data may be stored in a fourth task queue 602. The control module of the target database server 200 may complete the commit of the changed data and reflect the committed changed data to the target database. The committed changed data may be data of which change is settled and data reflected to the target database.

The division mode causes the target database server 200 to execute the assembly operation to be executed in the source database server 100 to reduce the load of the source database server. The division mode may increase the quantity of available resources of the source database server and allow more users access or allow multiple accesses to the database or data changes.

Figure 7:
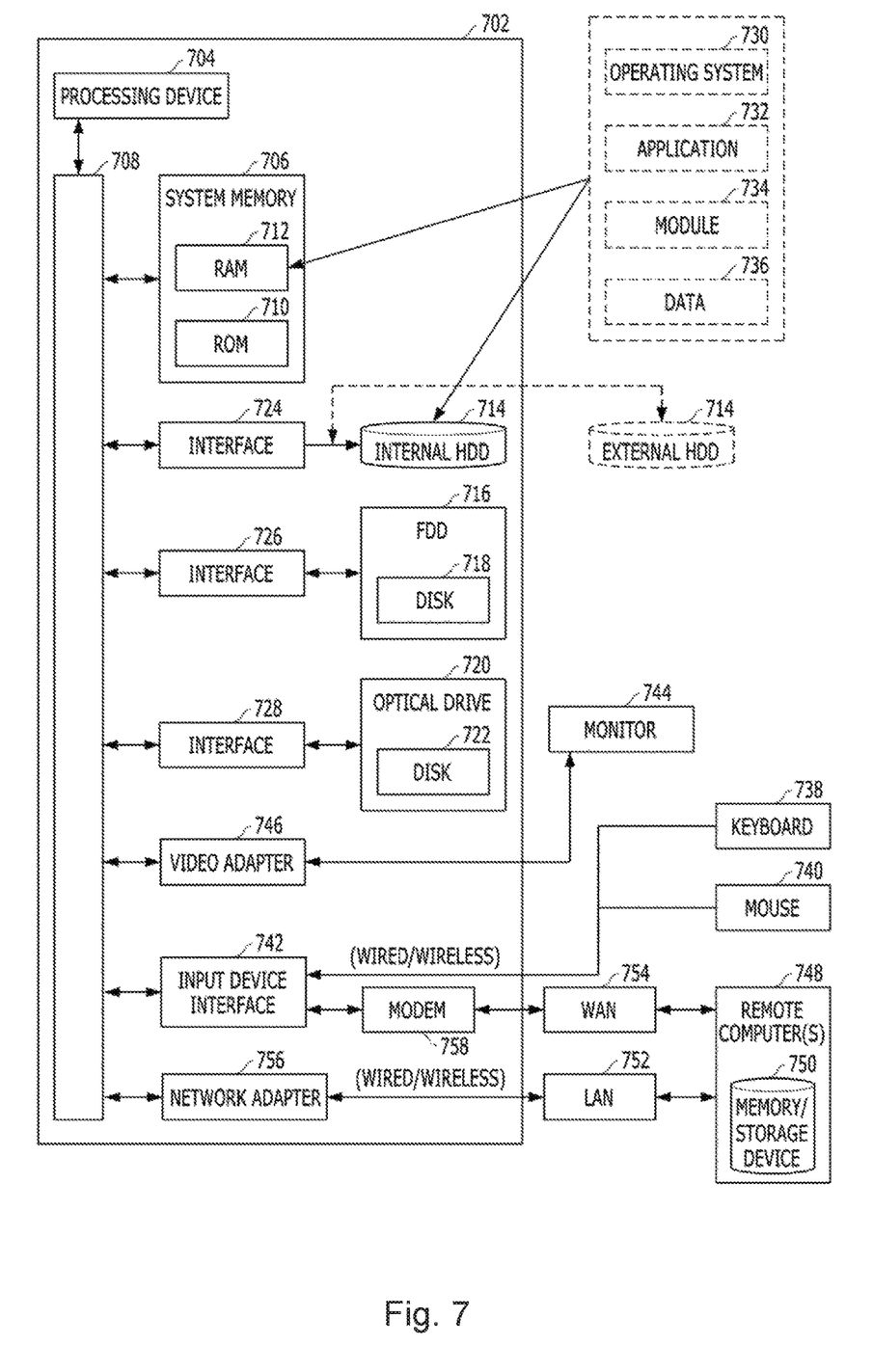
FIG. 7 is a block diagram of an exemplary computing device for implementing synchronization of a database according to an embodiment of the present disclosure.

FIG. 7 is a block diagram of an exemplary computing device for implementing a CDC solution according to an embodiment of the present disclosure.

The present disclosure has generally been described above in association with features which may be executed on computers or processors in one or more servers, but it will be well appreciated by those skilled in the art that the present disclosure can be implemented in a combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices) as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include computer storage media. The computer storage media include volatile and non-volatile, temporary or non-temporary, and movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The transceiving (communication) media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, transmitting/receiving (communication) media include wired media such as a wired network or a direct-wired connection and wireless media such as acoustic, RF, infrared and other wireless media.

In FIG. 7, an exemplary environment that implements various aspects of the present disclosure including a computing device 702 for implementing the CDC features according to the present disclosure is shown and the computing device 702 includes a processing device 704, a system memory 706, and a system bus 708. The system bus 708 connects system components including the system memory 706 (not limited thereto) to the processing device 704. The processing device 704 may be a predetermined processor among various commercial processors. A dual processor or other multi-processor architectures may also be used as the processing device 704.

The system bus 708 may be any one of several types of bus structures which may be additionally interconnected to a local bus using any one of a memory bus, a peripheral device bus, and various commercial bus architectures. The system memory 706 includes a read only memory (ROM) 710 and a random access memory (RAM) 712. A basic input/output system (BIOS) is stored in the non-volatile memories 710 including the ROM, the EPROM, the EEPROM, and the like and the BIOS includes a basic routine that assists in transmitting information among components in the computing device 702 at a time such as in-starting. The RAM 712 may also include a high-speed RAM such as a static RAM for caching data.

The computing device 702 also includes an internal hard disk drive (HDD) 714 (for example, EIDE and SATA) (the internal hard disk drive (HDD) 714 may also be configured for an external purpose in an appropriate chassis (not illustrated)), a magnetic floppy disk drive (FDD) 716 (for example, for reading from or writing in a mobile diskette 718), and an optical disk drive 720 (for example, for reading a CD-ROM disk 722 or reading from or writing in other high-capacity optical media such as the DVD). The hard disk drive 714, the magnetic disk drive 716, and the optical disk drive 720 may be connected to the system bus 708 by a hard disk drive interface 724, a magnetic disk drive interface 726, and an optical drive interface 728, respectively. An interface 724 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computing device 702, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 730, one or more application programs 732, other program module 734, and program data 736 may be stored in the drive and the RAM 712. All or some of the operating system, the application, the module, and/or the data may also be cached by the RAM 712. It will be well appreciated that the present disclosure may be implemented in operating systems which are commercially usable or a combination of the operating systems.

A user may input commands and information in the computing device 702 through one or more wired/wireless input devices, for example, pointing devices such as a keyboard 738 and a mouse 740. Other input devices (not illustrated) may include a microphone, an IR remote controller, a joystick, a game pad, a stylus pen, a touch screen, and others. These and other input devices are often connected to the processing device 704 through an input device interface 742 connected to the system bus 708, but may be connected by other interfaces including a parallel port, an IEEE 1394 serial port, a game port, a USB port, an IR interface, and others.

A monitor 744 or other types of display devices are also connected to the system bus 708 through interfaces such as a video adapter 746, and the like. In addition to the monitor 744, the computer generally includes a speaker, a printer, and other peripheral output devices (not illustrated).

The computing device 702 may operate in a networked environment by using a logical connection to one or more remote computers including remote computer(s) 748 through wired and/or wireless communication. The remote computer(s) 748 may be a workstation, a server computer, a router, a personal computer, a portable computer, a microprocessor based entertainment apparatus, a peer device, or other general network nodes and generally includes multiple components or all of the components described with respect to the computing device 702, but only a memory storage device 750 is illustrated for brief description. The illustrated logical connection includes a wired/wireless connection to a local area network (LAN) 752 and/or a larger network, for example, a wide area network (WAN) 754. The LAN and WAN networking environments are general environments in offices and companies and facilitate an enterprise-wide computer network such as Intranet, and all of them may be connected to a worldwide computer network, for example, the Internet.

When the computing device 702 is used in the LAN networking environment, the computing device 1002 is connected to a local network 752 through a wired and/or wireless communication network interface or an adapter 756. The adapter 756 may facilitate the wired or wireless communication to the LAN 752 and the LAN 752 also includes a wireless access point installed therein in order to communicate with the wireless adapter 756. When the computing device 702 is used in the WAN networking environment, the computing device 702 may include a modem 758 or is connected to a communication server on the WAN 754, or has other means that configure communication through the WAN 754 such as the Internet, etc. The modem 758 which may be an internal and external and wired or wireless device is connected to the system bus 708 through the serial port interface 742. In the networked environment, the program modules described with respect to the computing device 702 or some thereof may be stored in the remote memory/storage device 750. It will be well known that illustrated network connection is exemplary and other means configuring a communication link among computers may be used.

The computing device 702 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.6(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 6 Mbps (802.6a) or 54 Mbps (802.6b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. n order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Further, various embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" include various other media that may store and possess command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is coherent with the principles and new features presented herein.

Related contents in the best mode for carrying out the present disclosure are described as above.

The present disclosure relates to a database, and more particularly, may provide an efficient change data capture (CDC) technique.

What is claimed is:

1. A non-transitory computer readable storage medium, which includes encoded commands, wherein executing the computer program by one or more processors of a computer system allows the one or more processors to perform steps for change data capture (CDC) between a source database and a target database, the steps comprising:
   a resource data acquisition step of acquiring resource data which is data obtained by monitoring a current resource of a source database server;
   a comparison information generation step of generating comparison information by comparing the resource data and a predetermined source database server load threshold value;
   a mode determination step of determining an operation mode of a changed data capture process which operates in the source database server based on the comparison information, the operation mode including a union mode and a division mode, wherein the mode determination step includes:
      determining the operation mode of the changed data capture process as the union mode when the resource data is less than the predetermined source database server load threshold value in the comparison information; and
      determining the operation mode of the changed data capture process as the division mode when the resource data is equal to or more than the predetermined source database server load threshold value in the comparison information;
   a mode changing step of changing the operation mode of the process to a mode determined in the mode determination step;
   an extraction step of extracting changed information included in a record of a redo log of the source database in the source database; and
   an operation performing step of performing an operation according to the changed operation mode in the mode changing step,
   wherein the operation performing step comprises:
      when the changed operation mode is the union mode, analyzing a transaction for the extracted changed information in the source database, reassembling associated transactions to generate changed data in the source database, completing commit of the changed data in the source database, and reflecting the committed changed data to a target database; or
      when the changed operation mode is the division mode, transmitting the changed information to the target database so as to generate the changed data in the target database by reassembling the transactions for the changed information in the target database and reflect committed changed data in the target database.

2. The non-transitory computer readable storage medium of claim 1, wherein a thread executing each step in each of the assembly step to the reflection step is processed by referring to a task queue, the task queue being at least a part of a memory storing the changed information and the changed data.

3. The non-transitory computer readable storage medium of claim 1, wherein in the mode changing step, a mode change is executed when the task queue is empty.

4. The non-transitory computer readable storage medium of claim 1, wherein the resource data acquisition step is a step of acquiring resource data which is data obtained by monitoring at least one resource of a CPU usage, a memory available capacity, and an input/output load of the source database server.

5. A server comprising one or more processors for performing change data capture (CDC) between a source database and a target database, the one or more processors comprising:
   a resource data acquisition module acquiring resource data which is data obtained by monitoring a current resource of a source database server;
   a comparison information generation module generating comparison information by comparing the resource data and a predetermined source database server load threshold value;
   a control module determining an operation mode of a changed data capture process which operates in the source database server based on the comparison information, the operation mode including a union mode and a division mode, and changing an operation mode of the process to the determined mode,
   wherein, the control module further:
      determines the operation mode of the changed data capture process as the union mode when the resource data is less than the predetermined source database server load threshold value in the comparison information; and
      determines the operation mode of the changed data capture process as the division mode when the resource data is equal to or more than the predetermined source database server load threshold value in the comparison information;
      extracts changed information included in a record of a redo log of the source database in the source database; and
      performs an operation performing step of performing an operation according to the changed operation mode in the mode changing step,
   wherein the operation performing step comprises:
      when the changed operation mode is the union mode, analyzing a transaction for the extracted changed information in the source database, reassembling associated transactions to generate changed data in the source database, completing commit of the changed data in the source database, and reflecting the committed changed data to a target database; or when the changed operation mode is the division mode, transmitting the changed information to the target database so as to generate the changed data in the target database by reassembling the transactions for the changed information in the target database and reflect committed changed data in the target database.

6. A method for performing change data capture (CDC) between a source database and a target database, the method comprising:

a resource data acquisition step of acquiring resource data which is data obtained by monitoring a current resource of a source database server;

a comparison information generation step of generating comparison information by comparing the resource data and a predetermined source database server load threshold value;

a mode determination step of determining an operation mode of a changed data capture process which operates in the source database server based on the comparison information, the operation mode including a union mode and a division mode, wherein the mode determination step includes:

determining the operation mode of the changed data capture process as the union mode when the resource data is less than the predetermined source database server load threshold value in the comparison information; and determining the operation mode of the changed data capture process as the division mode when the resource data is equal to or more than the predetermined source database server load threshold value in the comparison information;

a mode changing step of changing the operation mode of the process to a mode determined in the mode determination step, an extraction step of extracting changed information included in a record of a redo log of the source database in the source database; and an operation performing step of performing an operation according to the changed operation mode in the mode changing step, wherein the operation performing step comprises:

when the changed operation mode is the union mode, analyzing a transaction for the extracted changed information in the source database, reassembling associated transactions to generate changed data in the source database, completing commit of the changed data in the source database, and reflecting the committed changed data to a target database; or when the changed operation mode is the division mode, transmitting the changed information to the target database so as to generate the changed data in the target database by reassembling the transactions for the changed information in the target database and reflect committed changed data in the target database.

* * * * *